Patented Aug. 9, 1938

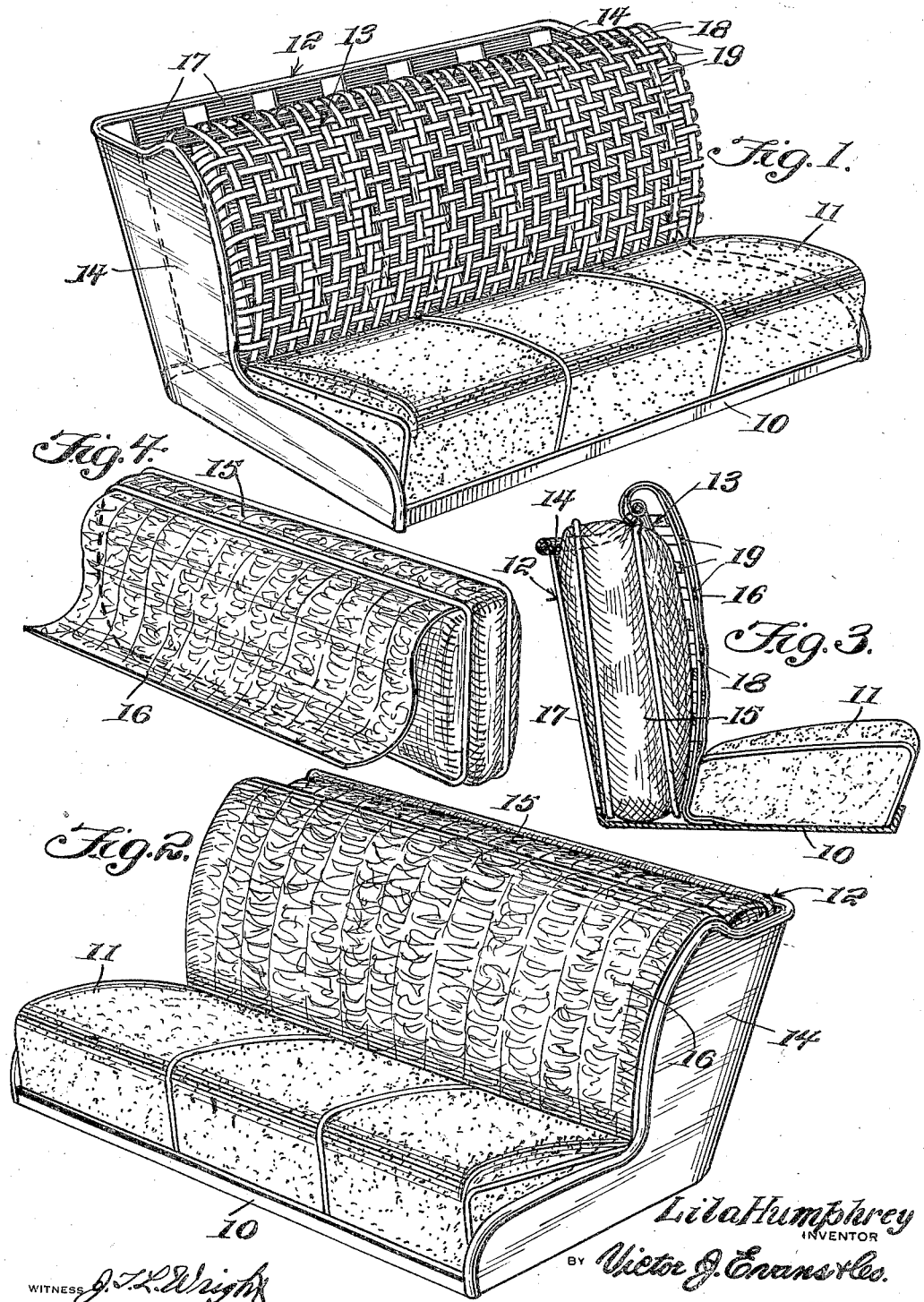

2,126,331

UNITED STATES PATENT OFFICE 2,126,331

AUTOMOBILE SEAT

Lila Humphrey, McGehee, Ark.

Application March 27, 1937, Serial No. 133,459

2 Claims. (Cl. 155—182)

This invention relates to automobile seats and has for an object to provide a seat of this type having the back rest formed in the nature of a ventilated compartment adapted to receive the back cushion for winter driving and adapted to receive luggage or packages in warm weather, the compartment being open at the top and having the front wall and the back wall provided with openings to assure ventilation through the front wall so as to be cool and comfortable for summer driving, when the back cushion is removed.

A further object is to provide an automobile seat of this type having the front wall of the back rest formed of resilient metal so as to yield readily and conform to the contour of the occupant's body, the front wall being reticulate so as to readily flex and also to promote ventilation through the perforations of the structure.

A further object is to provide an automobile seat of this type which will be formed of a few strong, simple and durable parts, which will be easy to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming part of this specification,

Figure 1 is a perspective view of an automobile seat constructed in accordance with the invention and showing the back cushion removed to provide ventilation through the reticulate front wall and reticulate back wall of the back rest.

Figure 2 is a perspective view of the seat illustrated in Figure 1 but showing the back cushion in place in the compartment of the back rest.

Figure 3 is a cross sectional view of the seat showing the back cushion and bottom cushion in place, as shown in Figure 2.

Figure 4 is a perspective view of the back cushion.

Referring now to the drawing in which like characters of reference designate similar parts in the various views, an automobile seat is shown comprising a sheet metal frame including a bottom 10 within which a conventional bottom cushion 11 is supported.

The back rest of the frame comprises a back wall 12 and a front wall 13 connected at the end by imperforate end walls 14. The front and back walls are spaced apart to provide a compartment between them to receive the back cushion 15 having a flap 16 secured to the upper front edge and adapted to be disposed upon the front wall 13 and confined at the free edge underneath the bottom cushion 11.

Both the front and back walls of the back rest are reticulate in structure and the perforations or orifices may be of any desired shape and magnitude. For example, the back wall may be formed of upright slats 17 spaced apart, as best shown in Figure 1. The front wall 13 may be formed of basket weave structure including integral strips 18 and 19 intersecting each other at a right angle. The front wall of the back rest is formed of resilient metal so as to be comfortable to the occupant. The front wall moreover is curved downwardly and rearwardly at the top, as shown in Figure 3, to promote yielding of the wall in the nature of a leaf spring.

In practice the back cushion 15 is removed for summer driving to permit air to circulate through the reticulate back wall and front wall of the back rest and thus eliminate a source of discomfort in summer driving, that is, presence of warm upholstery against the occupant's back.

The compartment formed between the reticulate front and back walls and the end walls of the back rest may be used for luggage and parcels when the back cushion is removed without impairing efficiency of the ventilated characteristic of the back rest as above described.

From the above description it is thought that the construction and operation of the invention will be fully understood without further explanation.

What is claimed is:

1. A convertible automobile seat comprising a back rest having front and rear walls spaced from each other and having an open top, a back cushion removably received between the walls through said open top, said front wall having ventilating perforations, removal of said cushion converting the seat from a winter driving seat to a summer driving seat, and a flap on the cushion adapted to extend over said front wall when the seat is used as a winter driving seat.

2. A convertible automobile seat comprising a back rest having front and rear walls spaced from each other and having an open top, a back cushion removably received between the walls through said open top, said front wall being formed of resilient metal and having ventilating perforations, removal of said cushion converting the seat from a winter driving seat to a summer driving seat, and a flap on the cushion adapted to extend over said front wall when the seat is used as a winter driving seat.

LILA HUMPHREY.